3,160,368
AIRCRAFT CONTROL MEANS
Pierre Henry John Young, Ian Mackenzie Milne, and Ralph Murch Denning, Bristol, England, assignors to Bristol Siddeley Engines Limited, Bristol, England, a British company
Filed Apr. 23, 1963, Ser. No. 275,085
Claims priority, application Great Britain, Apr. 25, 1962, 15,803/62
7 Claims. (Cl. 244—76)

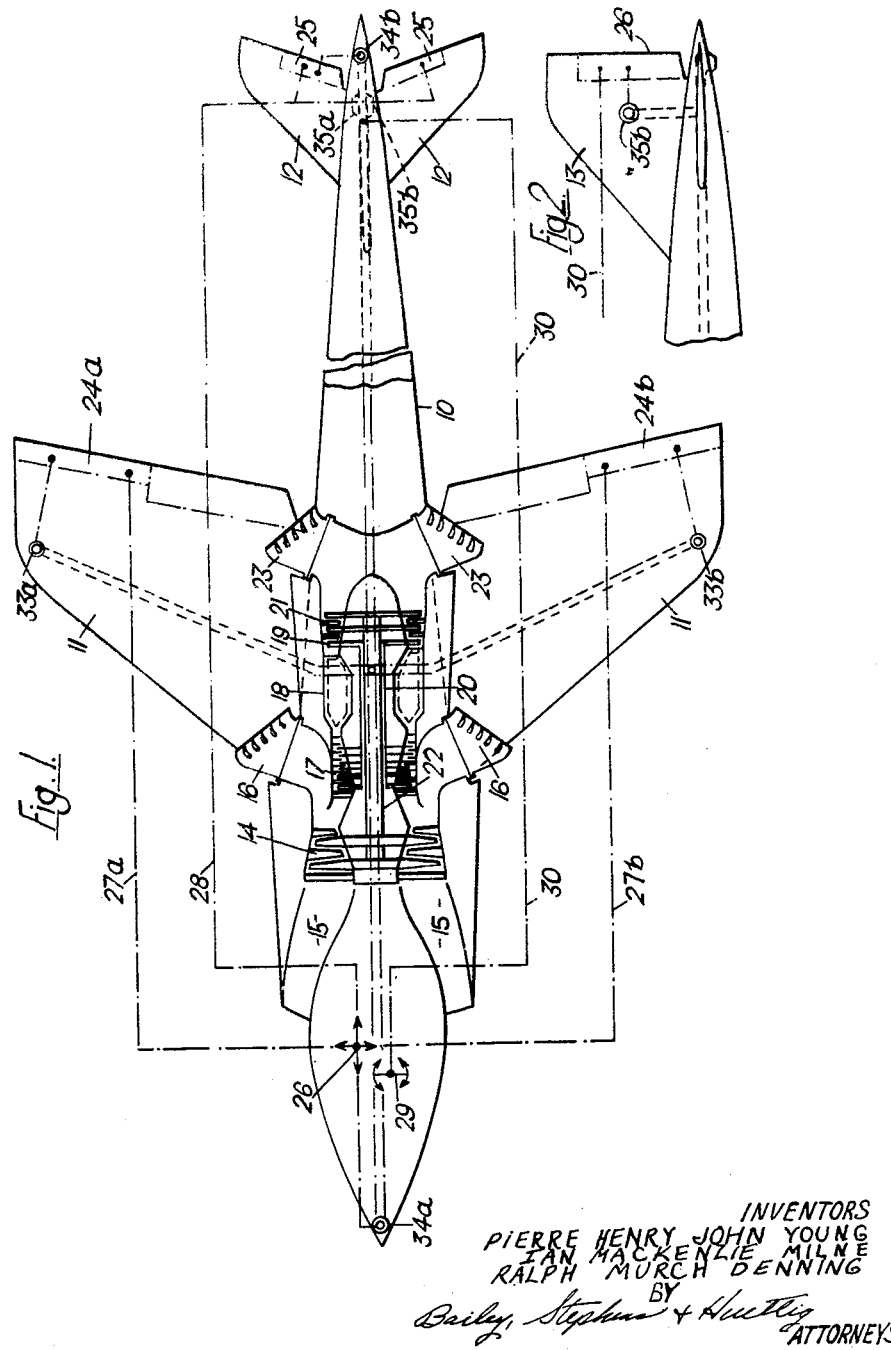

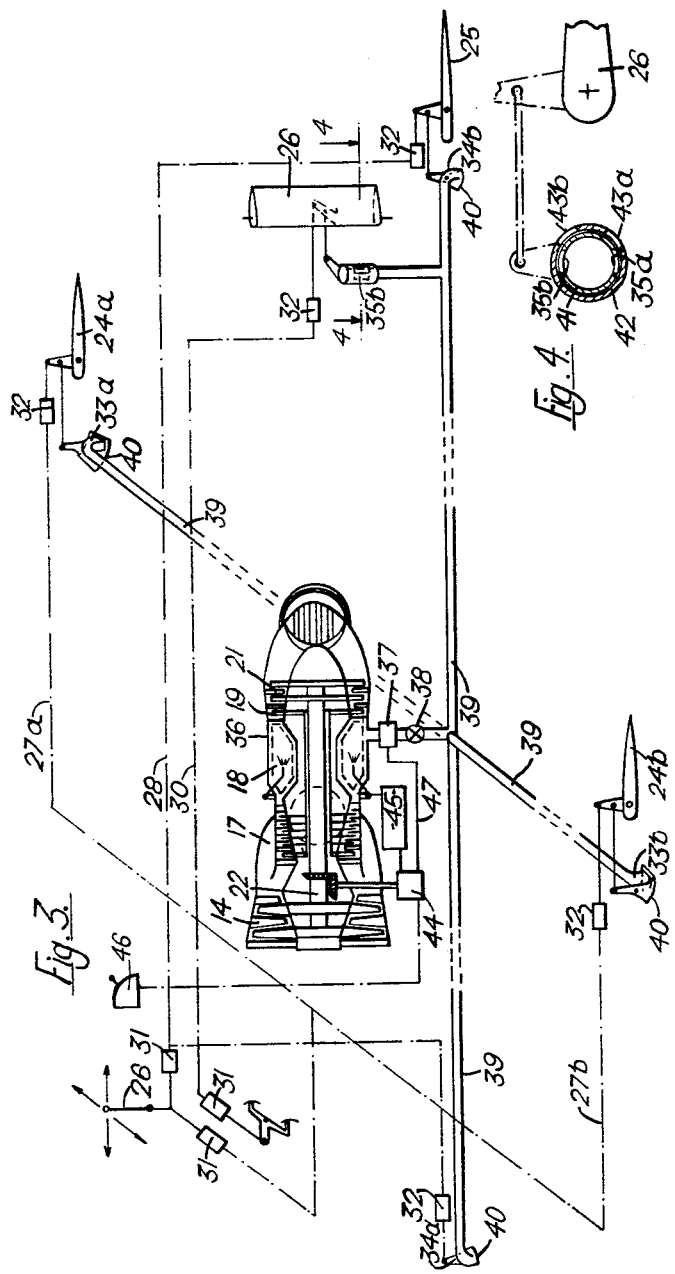

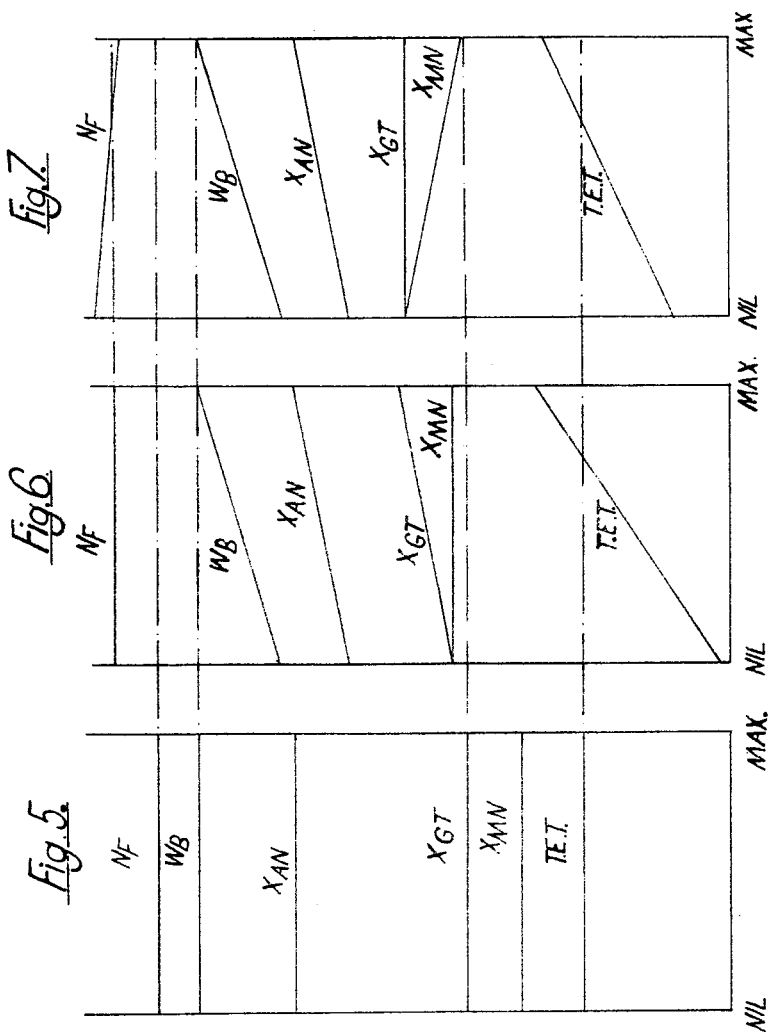

This invention relates to air-breathing gas turbine power plants for aircraft with vertical or short take off and landing capability, and to aircraft including such power plants and having auxiliary jet nozzles supplied with working fluid bled from the power plant for the purpose of controlling the attitude of the aircraft.

According to the invention an air-breathing gas turbine power plant constructed to produce upthrust by downward discharge of working fluid comprises: compressor means for producing the said downward discharge; turbine means connected to drive the compressor means; a combustor upstream of the turbine means; means for supplying compressed gas including uncombusted atmospheric oxygen to the combustor; means for supplying fuel to the combustor; variable-datum speed governing means arranged to act on the fuel supply means to maintain the rotary speed of the turbine means constant; means for bleeding compressed gas from upstream of the turbine means substantially at combustor pressure; and automatic means responsive to bleed flow arranged to act on the governing means in the sense to lower the datum speed with increase of bleed flow.

The term "compressor means" is used here as a generic term for compressors and for fans. There may be a fan and a compressor, the fan discharge going partly to downward discharge and partly to the compressor. Alternatively a compressor may draw air from a separate intake. The power plant may include one or more other engines, which may or may not be of a kind producing upthrust. The compressed gas for the combustor may be derived from the compressor driven by the turbine downstream of the combustor, or may be derived from another engine.

The invention also includes an aircraft having a power plant as defined in the preceding paragraph; pilot-operable means for adjusting the datum of the governing means; a plurality of auxiliary jet nozzles connected to receive the gas bled from the power plant and so arranged and spaced from the centre of gravity of the aircraft as to be capable of producing moments on the aircraft to alter its attitude; a normally closed valve in or adjacent to each auxiliary nozzle; and control means arranged to open the valve pertaining to each nozzle only on demand for an attitude control moment which can be produced at least in part by discharge from the nozzle.

In aircraft having power plants constructed to produce upthrust by downward discharge of working fluid, and auxiliary attitude control nozzles, it has been the practice, during take off and landing, when the aircraft has insufficient forward speed for aerodynamic control surfaces, if provided, to be effective, to provide the auxiliary nozzle system with a constant supply of working fluid and to vary its distribution differentially between the nozzles to control the attitude of the aircraft. This arrangement has the advantages that the operation of the power plant is not disturbed by constantly varying demand from the attitude control system, and also that the control moments can be pure couples around the centre of gravity of the aircraft. The bleeding of working fluid from the power plant substantially at combustor pressure, i.e. at or near the maximum pressure of the working cycle (maximum pressure being desirable to reduce the size and weight of ducting to the auxiliary nozzles) does, however, substantially reduce the available power output and may be described as "thermodynamically expensive." In other words, an economy in the use of such working fluid will permit an increase in the total upward thrust of the power plant.

One feature of the present invention, which enables such an economy to be effected, consists in the provision of a normally closed valve in or adjacent to each auxiliary nozzle, and control means arranged to open the valve pertaining to each nozzle only on demand for an attitude control moment which can be produced at least in part by discharge from that nozzle.

The advantage of this feature is best explained by considering a power plant which has a governor arranged to maintain the turbine speed at any constant datum value selected by the pilot of the aircraft, by altering the fuel supply to the combustor as necessary to correct any deviation of speed from the slected datum value. This constant turbine speed will result in constant compressor speed and hence constant thrust from the downward discharge of working fluid provided by the turbine. An upper limit on the pilot's selection of turbine speed, and hence of thrust, is imposed by the fact that increased speed involves increased fuel flow, higher combustor temperature and high turbine entry temperature. The latter is the principal factor governing engine life, and there is, for any engine, a value of turbine entry temperature which ought not to be exceeded for any substantial length of time.

Suppose that this power plant is operating with constant auxiliary nozzle bleed and then suppose it to be modified in accordance with the above-mentioned feature of the invention. At maximum control demand, the situation will be unchanged, but at zero control demand the compressed gas supply to the combustor will all pass to the turbine instead of being split between the turbine and the auxiliary nozzles. In consequence there is increased mass flow through the turbine, and the same speed is maintained with a lower turbine entry temperature (about the same amount of fuel being burnt in a larger amount of air). Under these conditions, the upper limit of selection of thrust by the pilot, by selection of turbine speed, can be increased, so that more thrust can be obtained from the same engine without exceeding the upper limit of turbine entry temperature. However, regard must be had to the fact that, upon introduction of a control demand the mass flow through the turbine will fall and hence the turbine entry temperature will rise. Since control demands are of short duration, and there is a time lag in the heating up of the turbine blades, it is possible to allow the turbine entry temperature at extreme control demand to exceed the normal upper limit, but on the other hand the turbine entry temperature at zero control demand cannot be permitted to be right up to this limit. Exactly what is permissible depends on the frequency and magnitude of control demands to be expected.

Another feature of this invention, which enables the rise of turbine entry temperature, with increase of control demand, to be reduced, consists in the provision of a variable-datum speed governor for the turbine means in conjunction with automatic means for lowering the datum with increasing rates of bleed of working fluid from the power plant.

Except for yaw control auxiliary nozzles, all the auxiliary nozzles can discharge downwards so that their thrusts, which increase with control demand, are additive to the upthrust produced by the compressor means. Consequently the governor datum can be lowered with increasing rates of bleed to the auxiliary nozzles so as to provide any desired relationship between rate of bleed and total upward thrust. For instance the arrangement may be such that the total upward thrust remains substantially constant for a given setting of the pilot-operable means.

An example of an aircraft and power plant in accordance with the invention is illustrated in the accompanying drawings, which are largely diagrammatic. In the drawings:

FIGURE 1 is an underneath plan view of the aircraft, partly in section;

FIGURE 2 is a side view of the tail portion only of the aircraft;

FIGURE 3 is a side sectional view of the power plant and diagrammatical representation of the flying control system;

FIGURE 4 is a sectional plan view of a detail in FIGURE 3, corresponding to the line 4—4 in that figure; and FIGURES 5, 6 and 7 are diagrams illustrating the operation of the governing system.

The aircraft shown in FIGURES 1 and 2 comprises a body 10 provided with a pair of wings 11, tail planes 12 and vertical tail fin 13. The body houses a power plant comprising a ducted fan 14 which receives air from intake ducts 15, compresses it and supplies part to a pair of swivelling pipe bend main nozzles 16, projecting through opposite sides of the body, and the remainder to a compressor 17 which discharges it at maximum cycle pressure into a combustion system 18 wherein fuel is burnt to heat the air. The heated air passes first through a high pressure turbine 19, coupled to the rotor of the compressor 17 by a shaft 20, and then through a low pressure turbine 21 coupled to the rotor of the fan 14 by a shaft 22. Finally, the exhaust from the turbines, now at a pressure below the maximum cycle pressure, is discharged through a second pair of swivelling pipe bend main nozzles 23. The nozzles 16 and 23 are arranged to swivel from a position, shown in FIGURE 1, in which the efflux is discharged rearwardly, for forward flight of the aircraft, to a position in which the efflux is discharged downwardly for vertical take off and landing of the aircraft. The power plant is positioned in the aircraft so that, at least when the nozzles are in the last mentioned positions, the resultant of the thrusts of the four nozzles passes through or close to the centre of gravity of the aircraft.

In this example, part of the working fluid of the power plant is ducted away to the nozzles 16 before reaching the maximum cycle pressure, and part is supplied to the nozzles 23 after its pressure has been reduced below the maximum cycle pressure by extraction of energy in the turbines 19 and 21. The invention is however equally applicable to power plants in which the main nozzles are wholly supplied with turbine efflux.

For attitude control in normal forward flight, the aircraft is provided with conventional ailerons 24a, 24b, elevators 25 and vertical rudder 26. The ailerons are operated differentially by sideways movements of a control column 26 through transmissions 27a, 27b, the elevators by fore and aft movement of the control column through a transmission 28, and the rudder by movements of a rudder bar 29 through a transmission 30. In FIGURE 3 the transmissions are indicated as each including a hydraulic transmitter 31 and slave units 32.

For attitude control when the aircraft has insufficient forward speed for the aerodynamic control surfaces to be effective, an auxiliary nozzle system is provided comprising a pair of downwardly directed nozzles 33a, 33b, at the wing tips for control in roll, a pair of downwardly directed nozzles 34a, 34b at the front and rear extremities of the body for control in pitch, and a pair of sideways directed nozzles 35a, 35b on the tail fin 13 for control in yaw.

As shown in FIGURE 3, working fluid for supply to the auxiliary nozzles is bled from the casing 36 of the combustion system 18, where the highest pressure of the operating cycle of the power plant is reached, and, after passing through a flow meter 37 and a shut off valve 38, enters distribution ducting 39. The function of the flow meter 37 is explained more fully later in this specification. Briefly, it is arranged to act, through a transmission 47, on a variable datum system of a governor 44. This governor is arranged to maintain the speed of the turbine 21 and fan 14 substantially equal to a value represented by the setting of the datum. The governor achieves this by altering the supply of fuel through a fuel system 45 to the combustion system 18 whenever the speed starts to depart from the datum value. The setting of the datum is effected by summation of the input from the transmission 47 and an input from a pilot-operable throttle control 46. The valve 38 permits the system to be shut off during forward flight at speeds sufficient to permit adequate control by the aerodynamic controls.

Each of the nozzles 33a, 33b, 34a and 34b is provided with a pivoted visor 40 for control of the outlet area and therefore the amount of working fluid discharged. The visors of the wing tip nozzles 33a and 33b are linked to the corresponding ailerons 24a and 24b so that when an aileron is turned downwards from a neutral position to raise the wing upon which it is mounted, the visor opens the nozzle to permit a thrust moment about the centre of gravity of the aircraft to be developed in the same sense. The opposite aileron will be simultaneously turned upwards, but the visors overlap the nozzle outlets sufficiently to keep the nozzles closed during movements in that direction. The visor 40 of the tail nozzle 34b is similarly linked to the elevators 25 so that the nozzle opens when the elevators are turned downwards from a neutral position. As there is no aerodynamic control surface adjacent the nozzle 34a at the front end of the body, the visor of this nozzle is operated by a hydraulic slave unit 32, connected to the elevator transmission system 28, in the sense that the nozzle opens when the elevators 25 are turned upwards.

The yaw control nozzles 35a and 35b may be similar and similarly linked to the vertical rudder 26 so that the nozzle on the side to which the rudder is turned opens. In FIGURES 3 and 4, however, a somewhat simplified system is illustrated in which the nozzle outlets 35a and 35b are openings in opposite sides of a cylindrical casing 41 and the visors are combined as an outer rotatable sleeve 42 having openings 43a and 43b which, in the neutral position of the rudder control, are out of register with the nozzle outlets but one or other of which moves towards register as the rudder control is operated.

FIGURE 5 illustrates vertical flight operation of an aircraft, not according to this invention, in which downwardly directed roll control and pitch control pairs of auxiliary nozzles are operated on the differential principle with a constant bleed of working fluid from the power plant. That is to say, that pairs of valves 40 in FIGURE 3, for roll control and for pitch control, are replaced by differentially-operating valves. The base of the diagram indicates control demand (i.e. control column displacement from a neutral position) increasing from "nil" on the left hand side to "maximum" on the right hand side. Plotted above this base, with suitable ordinate scales in each case, and for a constant setting of the pilot-operable control 46 corresponding to maximum permissible thrust are:

(a) Fan speed $N_F$. This is held constant by the governor 44 (FIGURE 3) operating on the fuel system 45 to control the supply of fuel into the combustion system 18. The speed datum of the governor is variable to lower values when desired by the pilot's throttle control 46, but the flow meter 37 and the connection 47 are absent, and so there is no automatic variation of datum.

(b) Mass flow of working fluid $W_B$ bled into the auxiliary nozzle ducting 39. This is also constant, as stated above.

(c) Turbine entry temperature T.E.T. This remains constant because $N_F$ and $W_B$ are constant.

(d) Main nozzle thrust $X_{MN}$. This remains constant.

(e) Auxiliary nozzle thrust $X_{AN}$. This remains constant.

(f) Gross total thrust $X_{GT}$. This is the sum of $X_{MN}$ and $X_{AN}$ because the thrust of all the nozzles is vertical.

FIGURE 6 illustrates, for comparison, the effect of controlling the auxiliary nozzles by means as shown in FIGURE 3, so that working fluid is only bled from the power plant when a control moment is demanded. This is in accordance with the first feature of the present invention, but without the second feature, i.e. without any automatic variation in the datum of the governor 44. The curve of $W_B$ therefore increases from zero at nil control demand to its maximum value (here taken to be the same as in the FIGURE 5 operation) at maximum control demand. The elimination of bleed at "nil" control demand produces a corresponding increase in mass flow through the turbine as explained earlier in this specification, so that if fan speed $N_F$ were held constant at the same value as in FIGURE 5, the turbine entry temperature T.E.T. at "nil" control demand would be lower than in FIGURE 5, and would only regain its previous value at "maximum" control demand. The higher part of the range of control demand is however only operative intermittently for short periods, so that, without sacrifice of engine life, it is possible to raise the permissible maximum power of the engine by raising the general level of T.E.T. as shown in FIGURE 6 by supplying more fuel. The additional power thus developed permits an increase in the fan speed $N_F$ (or use of a fan with greater mass flow at the same speed) and leads to an increase in main nozzle thrust $X_{MN}$ as compared with FIGURE 5. Gross total thrust $X_{GT}$ now increases with control demand from a value at "nil" control demand somewhat above the value shown in FIGURE 5 to a substantially greater value at "maximum" control demand. This high final value is not however of much significance in the operation of the aircraft, and therefore, in accordance with the second feature of this invention, it is preferably exchanged for additional improvement in gross total thrust at "nil" and small control demand conditions, as will now be explained.

To achieve this result, the flow meter 37 provided in the bleed duct from the power unit is arranged to act through the transmission 47 on the variable datum system of the governor 44 so that fan speed $N_F$ is reduced as bleed flow increases, for a given setting of the pilot-operable throttle control 46. As shown in FIGURE 7, which relates to the combined use of both features of the present invention, the result of this is to reduce the slope of the T.E.T. curve, and for the same engine life it becomes possible to raise $N_F$ and $X_{GT}$ still further at "nil" control demand. The ratio of reduction of datum speed to increase of bleed flow is represented by the downward slope for the graph of $N_F$ against control demand. This slope can be chosen in accordance with the performance characteristics desired. For example, in the particular case shown in FIGURE 7, the slope of this graph is such as to make $X_{GT}$ independent of control demand. This has the double advantage of raising $X_{GT}$ to the maximum value attainable in the condition which is, or should be, most common in the operation of a well-designed aircraft, namely a condition of "nil" or small control demand, and of making the vertical acceleration of the aircraft during take off and landing independent of the control demand.

The downward slope of the graph of $N_F$ against control demand can with advantage in most cases be greater than that (shown in FIGURE 7) at which $X_{GT}$ becomes constant. With such a greater slope, and still with the same engine life, the gross total thrust associated with low control bleed rates is increased at the expense of the gross total thrust at high bleed rates. Quite a large reduction in $X_{GT}$ can be tolerated at the "maximum" demand end of the control range since the periods of time involved are too short for the reduction in $X_{GT}$ to have a significant effect on the vertical speed of the aircraft.

In the discussion of FIGURES 5, 6 and 7, account has not been taken of the bleed fluid discharged horizontally for control in yaw, but this does not materially affect the general argument since relatively small quantities of bleed fluid are generally used for this purpose.

Actually, on part of the control bleed air being used to produce thrust in other than an upward direction a discontinuity will be produced in the $X_{GT}$ line of FIGURE 6 or FIGURE 7. If the effect is objectionably large the effect could be compensated by providing additional datum control of the governor 44. For example, the downwardly directed front and rear pitch control nozzles 34a and 34b may be replaced by upward and downward nozzle outlets at one end only of the aircraft, in the interest of saving weight by elimination of one branch of the distribution ducting 39. Then the effect of discharge through the upward nozzle may be compensated by additional datum control responsive to flow direction at the pitch control nozzles.

In systems according to the invention it is furthermore practicable to allow for a substantial excess of control power over normal requirements. Such an extension of the control range involves no discontinuity in the operating mechanism, and as the high bleed flow extremity of the range will be used relatively infrequently and only for short periods, the lag in the response of metal temperature, e.g. of turbine blades, to gas temperature provides a significant safeguard against ill effects upon the power plant. In contrast, in a system with differentially controlled auxiliary valves, any increase in the control range necessitates an increase in the rate of bleed at "nil" and small control demands.

In the example discussed in detail, the power plant is of the lift-thrust type in which the main discharge may, at the selection of the pilot, be directed downwardly for lift, or rearwardly for forward thrust. However, the invention is also applicable to aircraft having a pure lift power plant with associated control nozzles, and a separate power plant for forward flight.

The term "variable-datum speed governing means" is intended to designate a governing means which will maintain the speed at any datum to which it is set, this datum being variable, however, by either mechanical or automatic means or by both.

We claim:

1. An air-breathing gas turbine power plant constructed to produce upthrust by downward discharge of working fluid comprising: compressor means for producing the said downward discharge; turbine means connected to drive the compressor means; a combustor upstream of the turbine means; means for supplying compressed gas including uncombusted atmospheric oxygen to the combustor; means for supplying fuel to the combustor; variable-datum speed governing means arranged to act on the fuel supply means to maintain the rotary speed of the turbine means constant; means for bleeding compressed gas from upstream of the turbine means substantially at combustor pressure; automatic means responsive to bleed flow arranged to act on the governing means in the sense to lower the datum speed with increase of bleed flow; and means independent of said automatic means to produce variation of the bleed flow.

2. An aircraft including a power plant according to claim 1; pilot-operable means for adjusting the datum of the governing means; a plurality of auxiliary jet nozzles connected to receive the gas bled from the power plant and so arranged and spaced from the centre of gravity of the aircraft as to be capable of producing moments on the aircraft to alter its attitude; a normally closed valve operatively associated with each auxiliary nozzle; and said means to produce variation of the bleed flow comprising control means arranged to open the valve pertaining to each nozzle only on demand for an attitude control moment which can be produced at least in part by discharge from the nozzle.

3. An aircraft according to claim 2 in which each auxiliary nozzle is associated with an aerodynamic control surface, and the valve of the nozzle is linked to the control surface to be progressively opened on deflection of the control surface in one direction from a neutral position and to remain closed during deflection of the control surface in the opposite direction.

4. An aircraft according to claim 2 in which auxiliary nozzles for pitch and roll control are all directed downwards.

5. An aircraft according to claim 4 in which the automatic means provides that relationship between governor datum and rate of bleed which maintains the total upward thrust on the aircraft substantially constant, for a given setting of the pilot-operable means.

6. An aircraft according to claim 4 in which the automatic means provides a relationship between governor datum and rate of bleed which causes the total upward thrust on the aircraft to be highest at zero rate of bleed, for a given setting of the pilot-operable means.

7. An aircraft according to claim 2 including a main nozzle connected to the power plant to receive air compressed to less than the maximum cycle pressure and a second main nozzle connected to the power plant to receive heated air which has been expanded in a turbine from the maximum cycle pressure.

References Cited in the file of this patent
UNITED STATES PATENTS

| | | |
|---|---|---|
| 2,603,063 | Ray | July 15, 1952 |
| 2,912,188 | Singlemann et al. | Nov. 10, 1959 |
| 3,008,672 | Moore et al. | Nov. 14, 1961 |